US008862514B2

(12) United States Patent
Eisen

(10) Patent No.: US 8,862,514 B2
(45) Date of Patent: *Oct. 14, 2014

(54) METHOD AND SYSTEM FOR IDENTIFYING USERS AND DETECTING FRAUD BY USE OF THE INTERNET

(75) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/248,867

(22) Filed: Oct. 9, 2008

(65) Prior Publication Data

US 2009/0037213 A1 Feb. 5, 2009

Related U.S. Application Data

(63) Continuation of application No. 10/791,439, filed on Mar. 2, 2004, now abandoned.

(51) Int. Cl.
*G06Q 40/00* (2012.01)
*G06F 21/73* (2013.01)
*G06Q 20/40* (2012.01)
*G06Q 30/00* (2012.01)
*G06Q 20/04* (2012.01)

(52) U.S. Cl.
CPC ............ *G06Q 20/4016* (2013.01); *G06F 21/73* (2013.01); *G06Q 20/40* (2013.01); *G06Q 30/0185* (2013.01); *G06Q 20/04* (2013.01)
USPC ......................................................... 705/44

(58) Field of Classification Search
USPC .................................. 705/73, 64, 44
See application file for complete search history.

(56) References Cited

U.S. PATENT DOCUMENTS

| | | | |
|---|---|---|---|
| 5,748,740 A * | 5/1998 | Curry et al. ..................... 705/65 |
| 5,764,275 A | 6/1998 | Lappington et al. | |
| 5,892,900 A | 4/1999 | Ginter et al. | |
| 6,092,053 A | 7/2000 | Boesch et al. | |
| 6,105,012 A | 8/2000 | Chang et al. | |
| 6,112,240 A | 8/2000 | Pogue et al. | |
| 6,148,407 A | 11/2000 | Aucsmith | |
| 6,163,771 A * | 12/2000 | Walker et al. ..................... 705/44 |
| 6,205,436 B1 * | 3/2001 | Rosen ............................... 705/65 |
| 6,678,666 B1 | 1/2004 | Boulware | |
| 6,718,363 B1 | 4/2004 | Ponte | |
| 6,892,307 B1 | 5/2005 | Wood et al. | |
| 6,895,507 B1 | 5/2005 | Tepler | |
| 6,898,709 B1 | 5/2005 | Teppler | |
| 6,908,030 B2 | 6/2005 | Rajasekaran et al. | |
| 6,957,339 B2 | 10/2005 | Shinzaki | |
| 7,089,585 B1 | 8/2006 | Dharmarajan | |
| 7,100,049 B2 | 8/2006 | Gasparini et al. | |
| 7,165,051 B2 * | 1/2007 | Ronning et al. ................. 705/64 |
| 7,191,467 B1 | 3/2007 | Dujari et al. | |
| 7,260,837 B2 | 8/2007 | Abraham et al. | |
| 7,272,728 B2 | 9/2007 | Pierson et al. | |
| 7,330,871 B2 | 2/2008 | Barber | |
| 7,349,955 B1 | 3/2008 | Korb et al. | |
| 7,438,226 B2 | 10/2008 | Helsper et al. | |
| 7,577,620 B1 | 8/2009 | Donner | |
| 2001/0016876 A1 * | 8/2001 | Kurth et al. ..................... 709/223 |
| 2002/0035622 A1 * | 3/2002 | Barber ........................... 709/220 |
| 2002/0056042 A1 * | 5/2002 | van der Kaay et al. ....... 713/178 |
| 2002/0073046 A1 | 6/2002 | David | |
| 2002/0112171 A1 | 8/2002 | Ginter et al. | |
| 2002/0153424 A1 * | 10/2002 | Li .................................. 235/492 |
| 2002/0156836 A1 | 10/2002 | Janosik, Jr. et al. | |
| 2002/0167965 A1 * | 11/2002 | Beasley et al. ................ 370/465 |
| 2003/0033356 A1 | 2/2003 | Tran et al. | |
| 2003/0070080 A1 | 4/2003 | Rosen | |
| 2003/0076242 A1 | 4/2003 | Burns et al. | |
| 2003/0105854 A1 | 6/2003 | Thorsteinsson et al. | |
| 2003/0115334 A1 | 6/2003 | Bhat et al. | |
| 2003/0172036 A1 | 9/2003 | Feigenbaum | |
| 2003/0182551 A1 | 9/2003 | Frantz et al. | |
| 2003/0208684 A1 | 11/2003 | Camacho et al. | |
| 2003/0233553 A1 * | 12/2003 | Parks et al. ..................... 713/178 |
| 2004/0006553 A1 | 1/2004 | de Vries et al. | |
| 2004/0034794 A1 | 2/2004 | Mayer et al. | |
| 2004/0105431 A1 | 6/2004 | Monjas-Llorente et al. | |
| 2004/0117321 A1 | 6/2004 | Sancho | |

(Continued)

FOREIGN PATENT DOCUMENTS

EP 0418144 A1 3/1991
EP 0923039 A1 6/1999

(Continued)

OTHER PUBLICATIONS

Derfler, et al. How Network Work. Millennium Ed., Que Corporation. Indianapolis. IN. 2000.

(Continued)

*Primary Examiner* — Jacob C. Coppola
(74) *Attorney, Agent, or Firm* — Wilson Sonsini Goodrich & Rosati

(57) ABSTRACT

A method and system for detecting and preventing Internet fraud in online transactions by utilizing and analyzing a number of parameters to uniquely identify a computer user and potential fraudulent transaction through predictive modeling. The method and system uses a delta of time between the clock of the computer used by the actual fraudulent use and the potentially fraudulent user and the clock of the server computer in conjunction with personal information and/or non-personal information, preferably the Browser ID.

13 Claims, No Drawings

(56) References Cited

U.S. PATENT DOCUMENTS

| | | |
|---|---|---|
| 2004/0181598 A1 | 9/2004 | Paya et al. |
| 2004/0203750 A1 | 10/2004 | Cowdrey et al. |
| 2004/0236696 A1* | 11/2004 | Aoki et al. .................. 705/50 |
| 2004/0236702 A1 | 11/2004 | Fink et al. |
| 2004/0254890 A1 | 12/2004 | Sancho et al. |
| 2005/0033653 A1* | 2/2005 | Eisenberg et al. .............. 705/26 |
| 2005/0033703 A1 | 2/2005 | Holdsworth |
| 2005/0076230 A1 | 4/2005 | Redenbaugh et al. |
| 2005/0108177 A1 | 5/2005 | Sancho |
| 2005/0113092 A1 | 5/2005 | Coppinger et al. |
| 2005/0131826 A1 | 6/2005 | Cook |
| 2005/0154676 A1* | 7/2005 | Ronning et al. ................ 705/44 |
| 2005/0188423 A1 | 8/2005 | Motsinger et al. |
| 2005/0278542 A1 | 12/2005 | Pierson et al. |
| 2006/0010072 A1* | 1/2006 | Eisen ............................ 705/44 |
| 2006/0048211 A1 | 3/2006 | Pierson et al. |
| 2006/0130132 A1 | 6/2006 | Dharmarajan |
| 2006/0155985 A1 | 7/2006 | Canard et al. |
| 2006/0200855 A1 | 9/2006 | Willis |
| 2006/0200856 A1 | 9/2006 | Salowey et al. |
| 2006/0264202 A1 | 11/2006 | Hagmeier et al. |
| 2006/0281541 A1* | 12/2006 | Nguyen et al. .................. 463/25 |
| 2006/0282660 A1 | 12/2006 | Varghese et al. |
| 2006/0287902 A1 | 12/2006 | Helsper et al. |
| 2007/0038568 A1 | 2/2007 | Greene et al. |
| 2007/0043837 A1 | 2/2007 | Kruse et al. |
| 2007/0073630 A1 | 3/2007 | Greene et al. |
| 2007/0204044 A1 | 8/2007 | Rice et al. |
| 2007/0220594 A1* | 9/2007 | Tulsyan ............................ 726/5 |
| 2007/0234070 A1* | 10/2007 | Horning et al. ................ 713/190 |
| 2007/0234409 A1 | 10/2007 | Eisen |
| 2007/0239606 A1* | 10/2007 | Eisen .............................. 705/51 |
| 2007/0294401 A1 | 12/2007 | Shkedi |
| 2008/0010678 A1 | 1/2008 | Burdette et al. |
| 2008/0040802 A1 | 2/2008 | Pierson et al. |
| 2008/0104672 A1 | 5/2008 | Lunde |
| 2008/0104684 A1 | 5/2008 | Lunde |
| 2008/0133420 A1 | 6/2008 | Barber |
| 2009/0083184 A1 | 3/2009 | Eisen |
| 2010/0004965 A1 | 1/2010 | Eisen |
| 2011/0082768 A1 | 4/2011 | Eisen |
| 2012/0174223 A1 | 7/2012 | Eisen |

FOREIGN PATENT DOCUMENTS

| | | |
|---|---|---|
| EP | 1256911 A1 | 11/2002 |
| WO | WO 01/11450 A1 | 2/2001 |
| WO | WO 02/091226 A1 | 11/2002 |
| WO | WO 03/025868 A1 | 3/2003 |
| WO | WO 03/075197 A2 | 9/2003 |
| WO | WO 03/075197 A3 | 12/2003 |
| WO | WO 2004/038997 A1 | 5/2004 |

OTHER PUBLICATIONS

Gralla, Preston. How the Internet Works. Millennium Ed., Que Corporation. Indianapolis, IN 1999.
White, Ron. How Computers Work. Millennium Ed., Que Corporation. Indianapolis, IN. 1999.
Kohno, et al. Remote Physical Device Fingerprinting. 2005 IEEE Syposium on Security and Privacy (IEEE S&P 2005); May 8-11, 2005; Oakland, California, U.S.A. 16 pages.
Manavoglu, et al. Probabilistic user behavior models. Data Mining. 2003; 203-210.
Eisen, O., U.S. Appl. No. 11/862,165, entitled "Methods and Apparatus for Detecting Fraud with Time Based Computer Tags" filed Sep. 26, 2007.
International search report dated Oct. 29, 2007 for PCT Application No. US2005/35532.
International search report dated Jul. 3, 2008 for PCT Application No. US2007/65776.
U.S. Appl. No. 12/732,034, filed Mar. 25, 2010, Eisen.
European search report and written opinion dated Nov. 15, 2010 for Application No. 08165224.0.
European search report dated Dec. 23, 2011 for Application No. 5818903.6.
Office action dated Mar. 27, 2013 for U.S. Appl. No. 12/496,572.
Office action dated Sep. 10, 2013 for U.S. Appl. No. 13/414,678.
Office action dated Jan. 6, 2010 for U.S. Appl. No. 11/241,739.
Office action dated Feb. 24, 2009 for U.S. Appl. No. 11/694,882.
Office action dated Mar. 3, 2008 for U.S. Appl. No. 11/241,739.
Office action dated Mar. 9, 2009 for U.S. Appl. No. 11/241,739.
Office action dated Mar. 14, 2012 for U.S. Appl. No. 12/892,868.
Office action dated Apr. 16, 2010 for U.S. Appl. No. 11/862,165.
Office action dated Apr. 20, 2012 for U.S. Appl. No. 12/732,034.
Office action dated May 9, 2008 for U.S. Appl. No. 10/791,439.
Office action dated Jun. 1, 2011 for U.S. Appl. No. 11/694,882.
Office action dated Jun. 11, 2008 for U.S. Appl. No. 11/694,882.
Office action dated Jul. 1, 2009 for U.S. Appl. No. 11/241,739.
Office action dated Jul. 7, 2009 for U.S. Appl. No. 11/862,165.
Office action dated Aug. 23, 2010 for U.S. Appl. No. 11/694,882.
Office action dated Sep. 16, 2008 for U.S. Appl. No. 11/241,739.
Office action dated Nov. 15, 2012 for U.S. Appl. No. 12/732,034.
Office action dated Nov. 19, 2012 for U.S. Appl. No. 12/892,868.
Office action dated Dec. 7, 2007 for U.S. Appl. No. 10/791,439.
Office action dated Dec. 23, 2009 for U.S. Appl. No. 11/694,882.
Office action dated Oct. 2, 2013 for U.S. Appl. No. 12/496,572.

* cited by examiner

METHOD AND SYSTEM FOR IDENTIFYING USERS AND DETECTING FRAUD BY USE OF THE INTERNET

CROSS-REFERENCE

This application is a continuation application of Ser. No. 10/791,439, filed Mar. 2, 2004 now abandoned, which is incorporated herein by reference in its entirety.

FIELD OF THE INVENTION

The invention relates to Internet purchasing or e-tail transactions and specifically to detecting fraud in such transactions when ordering products, services, or downloading information over the Internet.

There is a continuing need to develop techniques, devices, and programs to detect and prevent Internet fraud. The present invention provides a method and a system for detecting and preventing Internet fraud by utilizing and analyzing a number of parameters to uniquely identify a customer and a potential fraudulent Internet-based transaction.

DESCRIPTION OF THE PRIOR ART

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user's name, address, phone number, and e-mail address will not suffice to detect and determine a probable fraudulent transaction because such information can be altered, manipulated, fraudulently obtained, or simply false.

Typically, an Internet user who accesses a website for obtaining a service, product, or information, not only enters personal information as mentioned above, but is also requested to provide a credit card account number, expiration date, and billing address. An online criminal seeking to obtain goods, services, or access to information (text and/or visuals over the Internet) commonly uses someone else's credit card information to obtain the services or products during the transaction. To prevent such occurrences, websites, via credit card companies and banks, often check to see if the address on the order corresponds or matches the address for the credit card owner. Although billing and shipping addresses can differ, such as when someone purchases a gift for another, it is a factor to consider in the verification process. Additionally, merchants utilize phone number matching between that of the Internet order and the credit card company's database. Another commonly used technique for order verification is e-mail address verification where the website operator sends a message to the user's e-mail address asking the customer to confirm the order prior to executing the same. Yet, online thieves frequently use e-mail addresses from large portal sites that offer free e-mail accounts. These e-mail addresses are easily disposable and make it harder for the website operator to identify the fraudulent customer before executing the transaction.

More sophisticated websites now capture a variety of parameters from the user known as Common Gateway Interface parameters (CGI parameters). These parameters commonly include non-personal information such as a user's Internet Protocol Address (IP Address). Every computer connected to the Internet is assigned a unique number known as its Internet Protocol (IP) Address. Much like a phone number in a home or office, an IP address can be used to identify the specific user or at least the particular computer used for an Internet transaction. In addition, since these numbers are usually assigned in country-based blocks, an IP address can often be used to identify the country from which a computer is connected to the Internet. Yet, IP addresses can change regularly if a user connects to the Internet via a dial-up connection or reboots their computer. Online thieves also have ways of scrambling their IP addresses or adopting another's IP address to make it nearly impossible for the website operator to identify the true user. Thus, websites typically use an IP address plus a further non-personal identifier such as a Browser ID (or user agent), a cookie, and/or a registration ID to try to identify a unique user and to prevent fraud in a second transaction.

A Browser ID provides the website operator with a wealth of information about the user such as the software being used to browse or surf the Internet. Additionally, the Browser ID includes information about the user's computer operating system, its current version, its Internet browser and the language. Thus, the Browser ID has valuable information for identifying a unique user. The Browser ID may also have more detailed information such as the type of content the user can receive; for example, this lets the website operator know if the user can run applications in FLASH-animation, open a PDF-file, or access a Microsoft Excel document. Yet, Browser IDs from different computers can be similar, as there are so many Internet users and thus many have similar computers with the same capabilities, programs, web browsers, operating systems, and other information. A cookie refers to a piece of information sent from the web server to the user's web browser which is saved on the resident browser software. Cookies might contain specific information such as login or registration information, online 'shopping cart' information, user preferences, etc. But cookies can easily be deleted by the computer's user, by the browser, or "turned off" completely so that the server cannot save information on the browser's software. Thus, cookies alone cannot serve as a unique identifier to thwart an Internet thief.

Accordingly, what is needed is a method and system that overcomes the problems associated with a typical verification and fraud prevention system for Internet transactions particularly in the purchasing of services, products, or information by uniquely identifying each consumer. Then, when that "consumer" seeks a second fraudulent purchase, the website operator will detect the same and block the order or, at least, obtain more information to ensure the order is legitimate. The system should be easily implemented within the existing environment and should be adaptable and compatible with existing technology.

SUMMARY OF THE INVENTION

In accordance with the present invention, a method and system is provided for detecting potentially fraudulent transactions over the Internet. The method and system comprises obtaining information relating to the transaction from the consumer and combining this information with a unit corresponding to the change of time, a delta of time parameter, to create a unique computer identifier. If a future transaction involves an identical computer identifier, as described below, which was previously engaged in a fraudulent transaction, the website operator can choose to cancel the transaction, pursue legal action, seek further verification, or the like. By using information relating to the first transaction, such as the IP address and/or Browser ID, and combining it with the delta of time parameter, as detailed herein, the website host can more accurately preventively track fraudulent users online by comparing computer identifiers to each other. In so doing, an integrated fraud prevention system is provided which allows the website host, merchant, or the like, to accurately and efficiently determine the validity or fraudulent quality of a transaction sought to be transacted over the Internet.

Accordingly, it is an object of the invention to provide a method and system for improving fraud detection in connection with Internet transactions.

It is another object of the invention to utilize existing technological capabilities to prevent online thieves from making second fraudulent transactions.

The above object and other objects, features, and advantages of the present invention are readily apparent from the following detailed description of the best mode for carrying out the invention when taken in connection with the accompanying chart.

BRIEF DESCRIPTION OF THE CHART

The chart illustrates the versatility and accuracy of the present invention in weeding out possible fraudulent online transactions.

DETAILED DESCRIPTION OF THE PREFERRED EMBODIMENT AND THE CHART

The present invention relates to a method and system for detecting potentially fraudulent transactions over the Internet. Various modifications to the preferred embodiment will be readily apparent to those skilled in the art and the general principles herein may be applied to other embodiments. The present invention is not intended to be limited to the embodiment shown but is to be accorded the widest scope consistent with the principles and features described herein. It is to be understood that the website, its host, or operator does not have to be a merchant of goods.

The present invention provides a fraud prevention system for online transactions by uniquely identifying a customer based on a number of parameters at least one of which is a delta of time parameter and another of which is preferably the Browser ID of the computer. Referring to the chart, what is shown is a series of typical transactions on the Internet between a merchant and several customers. Each customer establishes a connection between his computer and the merchant's website. Upon making this connection, the merchant's website receives some non-personal identification information from the customer. This non-personal information typically includes Common Gateway Interface (CGI) parameters such as the customer's Internet Protocol (IP) Address and the computer's Browser ID. While "hackers" can change, disguise, and/or emulate the IP address to mask a fraudulent transaction, most do not now have the capability nor the idea to do the same for the Browser ID. While some "hackers" can change the Browser ID, it is not a trivial tool and if one needs to change it all the time it is not allowing those thieves to easily steal, hence, they are likely to go to a site that does not check Browser IDs. In a typical embodiment, when the customer decides to purchase services, goods, or information from the website, the customer must input additional and more personal information. This personal identification information may commonly include the customer's name, address, billing and shipping information, phone number, and/or e-mail address. A key feature of the present invention is that the website server also captures the local time of the customer's computer, typically through a program such as Javascript, as well as the local time of the server's computer. The server then calculates the time difference (or delta of time) between the customer's computer clock and the server's computer clock. This can be recorded in any desired format such as hours, minutes, seconds, or the like, but corresponds to a delta of time parameter. The delta of time parameter, the non-personal information, including but not limited to the preferred usage of the Browser ID, and/or the personal information are stored by the merchant and used to uniquely identify the customer.

Because computer users rarely personally change the internal clocks within their computers, the delta of time parameter will likely be the same (or within a range) for a computer every time that computer is used to conduct an online transaction with the same merchant even if the user disguises or changes the IP address. The Browser ID is also not likely to be changed, even by a consumer seeking to perpetuate a fraudulent transaction. Thus, the delta of time parameter (the difference between the time of day of the computer user's clock and the time of day on the website's server clock) is an important component of the computer identifier because it, along with the preferred Browser ID or other personal or non-personal information, is a good indication of the identity of a subsequent user on the same computer. The delta of time parameter also allows the merchant to potentially locate the computer in terms of a time zone, region, or country.

Once a merchant determines that a first fraudulent transaction may have been made, the merchant can flag the customer's computer identifier, i.e. Browser ID and delta of time. In a preferred embodiment, the computer identifier will include at least its delta of time and Browser I), but may also include other personal and/or non-personal information. Then, the matching parameter can be used to identify a subsequent transaction which reveals a user with an identical set of computer identifiers. The matching is typically implemented by software, for example, on a hard disk, floppy disk, or other computer-readable medium. After the comparison has been made, the software assigns a matching value to the pair of transactions based on the similarities between the first and subsequent transaction. The website server may inform the merchant of the matching value, cancel the transaction, inform the costumer of the status of their order, demand more information, or the like. The merchant may then choose its desired course of action.

A particularly important feature of the present invention is the merchant's ability to include, remove, and weigh each parameter within the computer identifier. For example, the merchant may choose to only use the delta of time parameter and Browser ID to form the unique computer identifier. Accordingly, the merchant may set the matching parameter to fit a level of comparison between the first and subsequent transaction. For example, since deltas of time may slightly change because of the differences in accuracy between the server and the user's computer clock mechanism, computer clocks and deltas may slightly vary over time. The merchant may set the matching parameter to include a range of delta of time, such as a few minutes, instead of an exact match. This way, even if the user's computer "loses time," the matching parameter will still identify the subsequent transaction as a potential fraudulent one based on other information within the computer identifier.

Although the present invention has been described in accordance with the embodiments shown, one of ordinary skill in the art will recognize that there could be variations to the embodiment and those variations would be within the spirit and scope of the present invention. Therefore, although the present invention was described in terms of a particular fraud prevention method and system, one of ordinary skill in the art readily recognizes, that any number or parameters can be utilized and their use would be within the spirit and scope of the present invention.

The invention claimed is:

1. A fingerprinting method to identify a user computer from other computers for an online transaction with an electronic commerce business comprising the steps of:
   creating, with aid of a processor, a first computer identifier in the course of a first online transaction with the electronic commerce business, and a second computer identifier in the course of a second online transaction with the electronic commerce business, wherein the first computer identifier identifies the user computer, wherein each computer identifier includes a delta of time parameter defined during the course of the online transaction by a time difference measured between a first clock measurement equal to a user computer local time and a second clock measurement equal to an electronic commerce business local time over a selected time interval;
   flagging the first computer identifier in response to determining the first online transaction may be a fraudulent transaction;
   comparing, with aid of the processor, the first computer identifier and the second computer identifier;
   determining, with aid of the processor, that a measured difference between the delta of time parameter of the first computer identifier and the delta of time parameter of the second computer identifier falls within a selected range; and
   indicating, to the electronic commerce business, that the user computer was used in the first online transaction and the second online transaction, based at least on the determination that the measured difference falls within the selected range.

2. The method as recited in claim 1, wherein the first clock measurement and the second clock measurement are each a measured using a JavaScript.

3. A non-transitory computer readable medium having instructions stored thereon that, when executed by a processor, cause the processor to perform a method to identify a user computer from other computers for an online transaction with an electronic commerce business, the method comprising:
   creating a first computer identifier in the course of a first online transaction with the electronic commerce business, and a second computer identifier in the course of a second online transaction with the electronic commerce business, wherein the first computer identifier identifies the user computer, wherein each computer identifier includes a delta of time parameter defined during the course of the online transaction by a time difference measured between a first clock measurement equal to a user computer local time and a second clock measurement equal to an electronic commerce business local time over a selected time interval;
   flagging the first computer identifier in response to determining the first online transaction may be a fraudulent transaction;
   comparing the first computer identifier and the second computer identifier;
   determining that a measured difference between the delta of time parameter of the first computer identifier and the delta of time parameter of the second computer identifier falls within a selected range; and
   indicating, to the electronic commerce business, that the user computer was used in the first online transaction and the second online transaction, based at least on the determination that the measured difference falls within the selected range.

4. The method as recited in claim 1, wherein each computer identifier further includes additional parameters including personal identification information.

5. The method as recited in claim 4, wherein the personal identification information includes consumer identification information.

6. The method as recited in claim 5, wherein the consumer identification information includes at least one of the following: consumer name, address, billing information, shipping information, telephone number and e-mail address.

7. The method as recited in claim 1, wherein each computer identifier further includes at least one non-personal identification parameter.

8. The method as recited in claim 7, wherein the non-personal identification parameter is computer identification information.

9. The method as recited in claim 8, wherein the computer identification information includes an Internet parameter.

10. The method as recited in claim 9, wherein the Internet parameter is a CGI parameter.

11. The method as recited in claim 10, wherein the CGI parameter includes a Browser ID.

12. The method as recited in claim 1, wherein each computer identifier includes relevant time zone information in which the user computer is physically located.

13. The method as recited in claim 1, wherein the delta of time parameter is stored as a range of time.

* * * * *